Sept. 22, 1936.  F. GRAFFENBERGER  2,054,934
PAPER RECEPTACLE
Filed Sept. 30, 1935
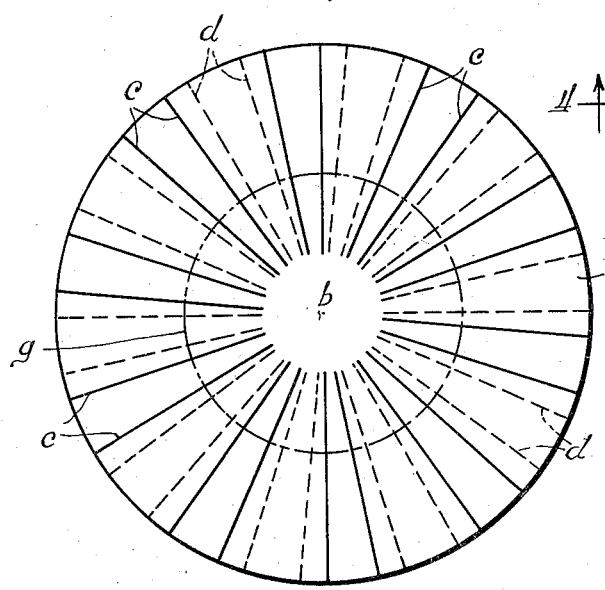
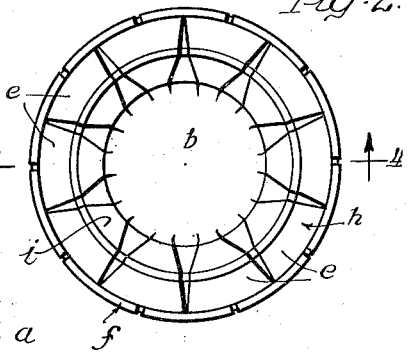
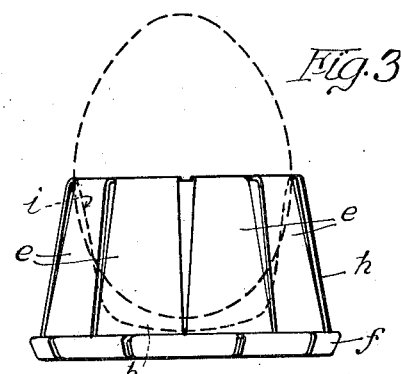
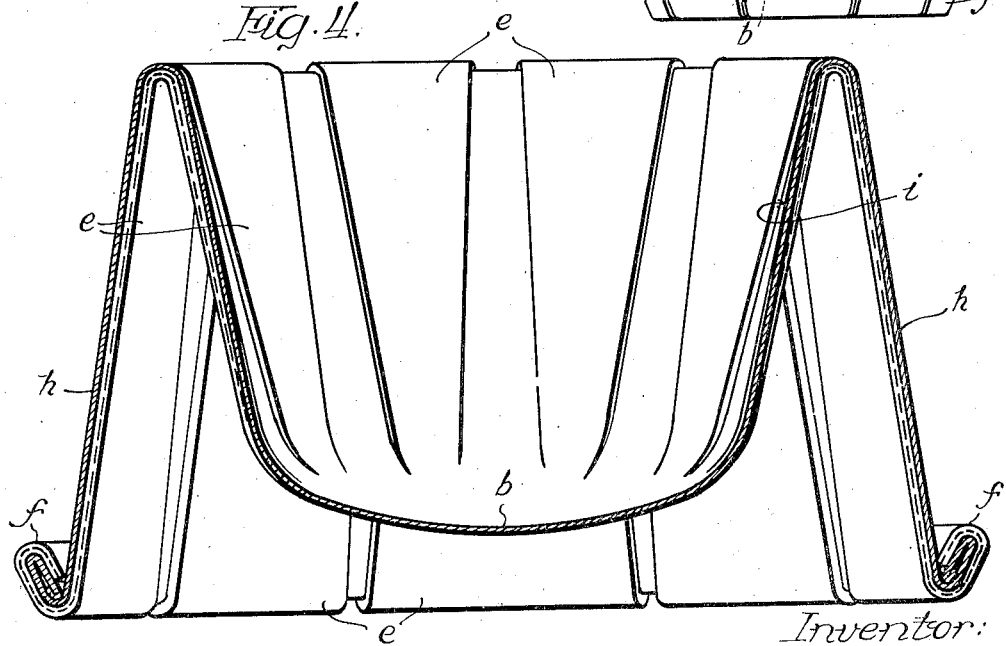
Inventor:
Fredrick Graffenberger.

Patented Sept. 22, 1936

2,054,934

UNITED STATES PATENT OFFICE 2,054,934

PAPER RECEPTACLE

Fredrick Graffenberger, Milwaukee, Wis., assignor to Milwaukee Lace Paper Company, Milwaukee, Wis., a corporation of Wisconsin Application September 30, 1935, Serial No. 42,727

1 Claim. (Cl. 229—21)

My invention relates to paper receptacles, particularly table ware, such as souffle cups and finger bowls.

The object of my invention is to provide an improved paper receptacle, with inherent means for better support than has obtained heretofore, and a paper receptacle which may be used efficiently as an egg cup.

My invention is illustrated in the accompanying drawing, in which

Figure 1 shows the blank from which the receptacle is formed;

Figure 2 is a plan view of the formed receptacle;

Figure 3 is an elevational view of the formed receptacle; and

Figure 4 is a vertical cross-sectional view, on a larger scale, taken on the plane of the line 4—4 of Figure 2 and looking in the direction indicated by the arrows.

The receptacle of my invention is formed from a single circular blank $a$ which is folded radially, from a central portion $b$, on the lines $c$ and $d$, to form box plaits $e$, $e$, resulting in a flared circular article, which is then provided with a turned-back rim $f$, and the central portion of which, indicated by the dotted line $g$ in Figure 1, is then turned inwardly to form a cup portion $i$, so that, when the article rests upon its rim, the outer wall portion $h$ forms a supporting means and the cup portion $i$ is suspended from the wall $h$ at the top, all as clearly shown in Figure 4.

Using it as a souffle cup, or finger bowl, the wall $h$ remains dry, retaining its supporting ability; the cup portion is supported from its top, rather than upon its bottom; and the article may conveniently be held while removing its contents with a spoon, the bottom of the cup portion being rounded to facilitate this.

It will appear that the plaits may be either box plaits or ordinary plaits, and, indeed, in the broader aspects of my invention, the article may be formed without plaiting. It may be said, however, that plaiting is of importance, in the matter of simplicity of manufacture, and also when the article is used as an egg cup, as indicated in Figure 3. I have indicated, in Figure 3, an egg inserted in the cup portion. Since eggs vary in size, it is of importance that the plaiting enables the article to accommodate itself to varying diameters. The diameter, at the top of the cup portion, is preferably made small enough so that an ordinary egg, inserted in it, is grasped tightly, the upper rim of the cup portion being capable of spreading so that this result may be accomplished. Also, the cup portion $i$ is so formed, as indicated in Figure 3, that an air space is left around the lower portion of the egg, this aiding in keeping the egg warm. With the egg in the receptacle, as shown, being tightly held therein, one may conveniently hold the wall $h$ and the rim $f$, thus firmly holding the egg for removal of the upper part of its shell and for removal of its contents with a spoon.

I claim:—

A paper receptacle comprising a blank of paper having radial plaits to impart a flaring shape and having a turned-back rim, the central portion being folded inwardly to form a cup supported at its top by the outer wall, said cup having a rounded bottom.

FREDRICK GRAFFENBERGER.